(12) United States Patent
Johnson et al.

(10) Patent No.: US 11,133,146 B2
(45) Date of Patent: Sep. 28, 2021

(54) SOLUTION ELECTRODE GLOW DISCHARGE APPARATUS

(71) Applicant: 2S WATER INCORPORATED, Edmonton (CA)

(72) Inventors: Neil Johnson, Edmonton (CA); Ander Palmgren, Edmonton (CA)

(73) Assignee: 2S WATER INCORPORATED, Edmonton (CA)

( * ) Notice: Subject to any disclaimer, the term of this patent is extended or adjusted under 35 U.S.C. 154(b) by 0 days.

(21) Appl. No.: 16/893,842

(22) Filed: Jun. 5, 2020

(65) Prior Publication Data
US 2021/0166907 A1 Jun. 3, 2021

(30) Foreign Application Priority Data
Dec. 2, 2019 (CA) .................. CA 3063389

(51) Int. Cl.
*H01J 1/06* (2006.01)
*H01J 7/24* (2006.01)

(52) U.S. Cl.
CPC . *H01J 1/06* (2013.01); *H01J 7/24* (2013.01)

(58) Field of Classification Search
CPC ...................... H01J 1/06; H01J 7/24
See application file for complete search history.

(56) References Cited

U.S. PATENT DOCUMENTS

| | | |
|---|---|---|
| 3,475,307 A | 10/1969 | Knox et al. |
| 3,884,793 A | 5/1975 | Penfold et al. |
| 4,116,793 A | 9/1978 | Penfold et al. |
| 4,406,658 A | 9/1983 | Lattin et al. |
| 4,853,539 A | 8/1989 | Hall et al. |
| 5,086,226 A | 2/1992 | Marcus |
| 5,221,561 A | 6/1993 | Flicstein et al. |
| 5,560,890 A | 10/1996 | Berman et al. |
| 6,376,972 B1 | 4/2002 | Tarasenko et al. |
| 6,388,381 B2 | 5/2002 | Anders |
| 6,686,998 B2 | 2/2004 | Gianchandani et al. |
| 7,929,138 B1 | 4/2011 | Webb et al. |
| 8,278,810 B2 | 10/2012 | Foret |
| 9,051,820 B2 | 6/2015 | Foret |
| 9,761,413 B2 | 9/2017 | Foret |
| 9,989,472 B2 | 6/2018 | Schroeder et al. |
| 10,269,525 B2 | 4/2019 | Marcus et al. |
| 2007/0040112 A1* | 2/2007 | Rottmann ............ H01J 49/12 250/288 |
| 2016/0307733 A1 | 10/2016 | Foret |
| 2018/0247804 A1 | 8/2018 | Shelley et al. |
| 2018/0372646 A1 | 12/2018 | Wang et al. |
| 2019/0101493 A1 | 4/2019 | Schroeder et al. |

FOREIGN PATENT DOCUMENTS

CN 102033103 A 4/2011

* cited by examiner

*Primary Examiner* — Joseph L Williams
(74) *Attorney, Agent, or Firm* — Finch & Maloney, PLLC; Michael J. Bujold; Jay S. Franklin

(57) ABSTRACT

A solution electrode glow discharge apparatus has a housing that contains a solid electrode. The solid electrode has a head and a tip. The tip of the solid electrode extends outwards from the housing. At least a portion of the head of the solid electrode is positioned with an electrical and thermal conducting block. An adjustable-polarity power supply is provided in communication with the solid electrode. A cooling mechanism is provided for cooling the electrical and thermal conducting block.

10 Claims, 5 Drawing Sheets

SOLUTION ELECTRODE GLOW DISCHARGE APPARATUS

FIELD OF THE DISCLOSURE

The present application relates generally to an apparatus for use in both solution cathode glow discharge (SCGD) and solution anode glow discharge (SAGD) processes.

BACKGROUND

This section provides background information to facilitate a better understanding of the various aspects of the invention. It should be understood that the statements in this section of this document are to be read in this light, and not as admissions of prior art.

Solution cathode glow discharge (SCGD) and solution anode glow discharge (SAGD) processes are each performed on single purpose apparatuses. While both methods utilize a high potential between a solid and a liquid electrode to generate a glow discharge, in actual practice SCGD and SAGD methods behave quite differently. In SCGD microplasmas, heavy ions from the flowing liquid electrode surface are released by boiling and then atomizing the solution. This allows for any contaminants within the sample to be identified through atomic emission spectroscopy. In SAGD microplasmas, the heavy ions travel in the opposite direction which causes an enormous amount of heat to be generated at the solid electrode. Due to electron bombardment, the solution becomes strongly oxidized which promotes the generation of volatile hydride compounds of the contaminants in the solution. These compounds rise out of the solution and are then atomized in the plasma. This allows for atomic emission spectroscopy to be employed to identify and quantify the contaminants in the sample.

The apparatuses used in SCGD and SAGD processes can be expensive. As a result, a tester may opt to only have one apparatus that is capable of either SCGD or SAGD and use it for all testing purposes. When testing for certain contaminants, it can be beneficial to use one method over the other. Testers without access to both apparatuses may not have an option and may be using the lesser of the processes to perform their tests.

BRIEF SUMMARY

There is provided a solution electrode glow discharge apparatus. The apparatus has a housing that contains a solid electrode. The solid electrode has a head and a tip and the tip of the solid electrode extends outwards from the housing. An electrical and thermal conducting block allows an electrical potential to be applied to the solid electrode and allow for heat generated at the solid electrode. At least a portion of the head of the solid electrode is positioned within the electrical and thermal conducting block. A adjustable-polarity power supply is provided in communication with the solid electrode. A cooling mechanism cools the electrical and thermal conducting block.

In one embodiment, a solution receptacle is positioned in spaced relation to the top of the solid electrode for holding solution to be tested. The solution to be tested has a different electrical potential than the electrical potential of the solid electrode. The solution receptacle is spaced from the tip of the solid electrode such that a glow discharge is maintainable.

In one embodiment, the cooling mechanism passively cools the electrical and thermal conducting block. Passive cooling may include the use of a heat sink or any other passive cooling system known to a person skilled in the art to pull heat away from the electrical and thermal conducting block.

In another embodiment, the cooling mechanism actively cools the electrical and thermal conducting block. Active cooling may include the use of a heat pumps such as Peltier coolers or any other active cooling mechanism known to a person skilled in the art.

In one embodiment, the adjustable-polarity power supply is provided in direct communication with the head of the solid electrode.

In another embodiment, the adjustable-polarity power supply is in indirect communication with the head of the solid electrode through direct communication with the electrical and thermal conducting block.

In one embodiment, an electrically insulated and thermally conducting barrier is provided between the electrical and thermal conducting block and the cooling mechanism.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

DETAILED DESCRIPTION OF THE PREFERRED EMBODIMENTS

Figure 1:
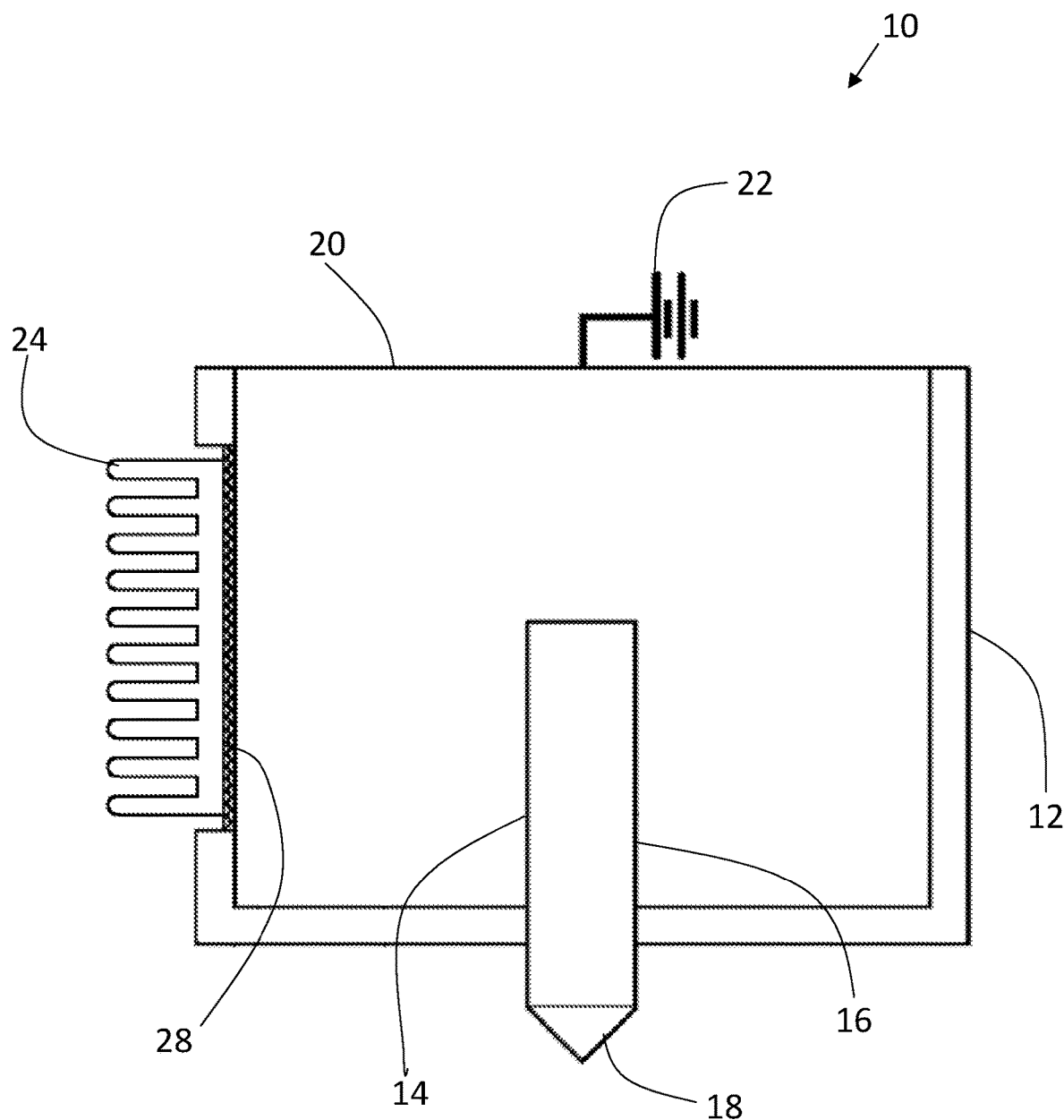
FIG. 1 is a schematic view of a solution electrode glow discharge apparatus.

A solution electrode glow discharge apparatus, generally identified by reference numeral 10, will now be described with reference to FIG. 1 through FIG. 5.

Figure 2:
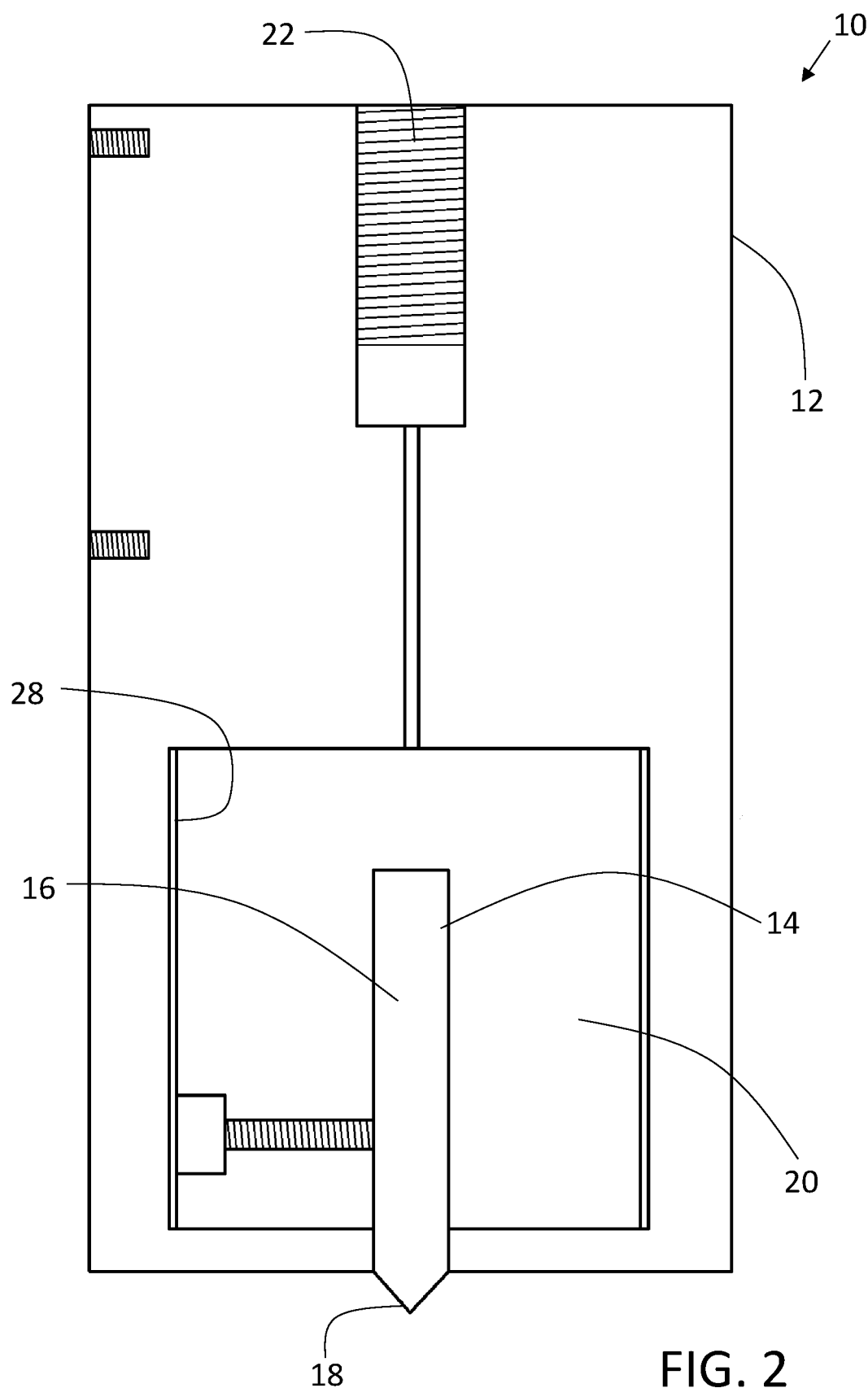
FIG. 2 is a side elevation view, in section, of a solution electrode glow discharge apparatus.
Figure 3:
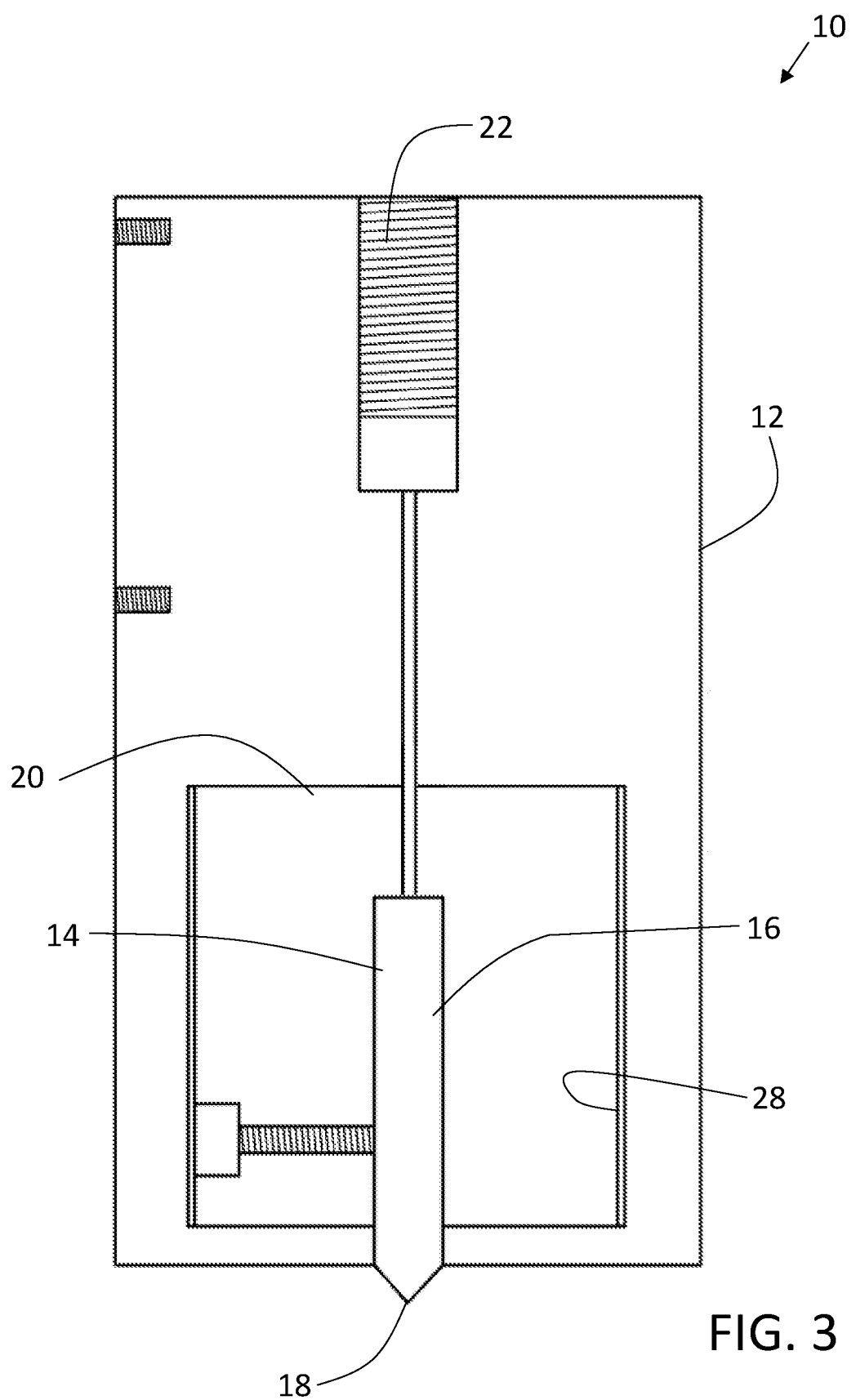
FIG. 3 is a side elevation view, in section, of a variation of the solution electrode glow discharge apparatus shown in FIG. 2.

Referring to FIG. 1, a solution electrode glow discharge (SEGD) apparatus 10 has a housing 12. Housing 12 is electrically insulated to protect users from injuries and electrocution when apparatus 10 is in use. Housing 12 contains a solid electrode 14. It will be understood by a person skilled in the art that the term solid is used to identify the state of matter of solid electrode 14. Solid electrode 14 is made of an electrically conducting material that is capable of handling the heat generated during a SAGD process. Solid electrode 14 has a head 16 and a tip 18. Tip 18 of solid electrode 14 extends outwards from housing 12. At least a portion of head 16 of solid electrode 12 is positioned within an electrical and thermal conducting block 20. Electrical and thermal conducting block 20 is positioned within housing 12 and allows for an electrical potential to be applied to solid electrode 14 and allows heat generated at solid electrode 14 to be conducted away from solid electrode 14. The ability of electrical and thermal conducting block 20 to draw heat away from solid electrode 14 may be of particular importance when apparatus 10 is used for a SAGD process which is generally known to create a large amount of heat. A adjustable-polarity power supply 22 is provided in communication with solid electrode 14. Referring to FIG. 3, adjustable-polarity power supply 22 may be in direct communication with head 16 of solid electrode 12. Referring to FIG. 2, adjustable-polarity power supply 22 may be in indirect communication with head 16 of solid electrode 12 through direct communication with electrical and thermal conducting block 20 that transfers the electric current to head 16 of solid electrode 12. The potential of the electrical power supplied to solid electrode 14 dictates which process, SAGD or SCGD, is being performed. For SAGD processes, a negative polarity or a potential that is lower than the potential applied to the analyte is supplied to solid electrode 14. For SCGD processes, a positive polarity or a potential that is higher than the potential applied to the analyte is supplied to solid electrode 14. A cooling mechanism 24 is provided for cooling electrical and thermal conducting block 20. Cooling mechanism 24 may provide active or passive cooling. Examples of cooling mechanisms 24 include heat pumps such as Peltier cooler, shown in FIG. 5, and heatsinks, shown in FIG. 1. A person skilled in the art will understand that other types of cooling mechanisms may be used.

Figure 4:
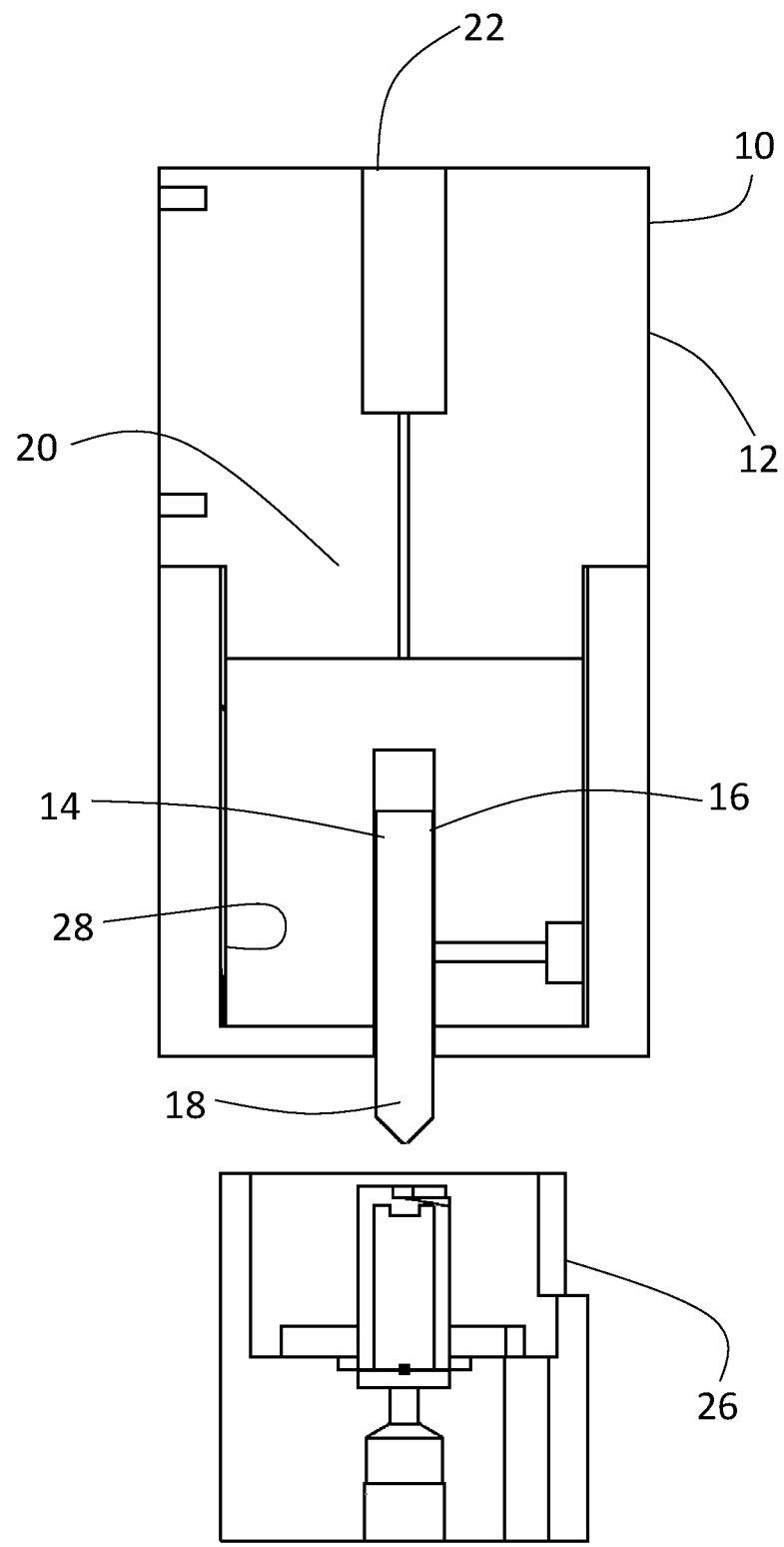
FIG. 4 is a side elevation view, in section, of a solution electrode glow discharge apparatus with a solution receptacle.
Figure 5:
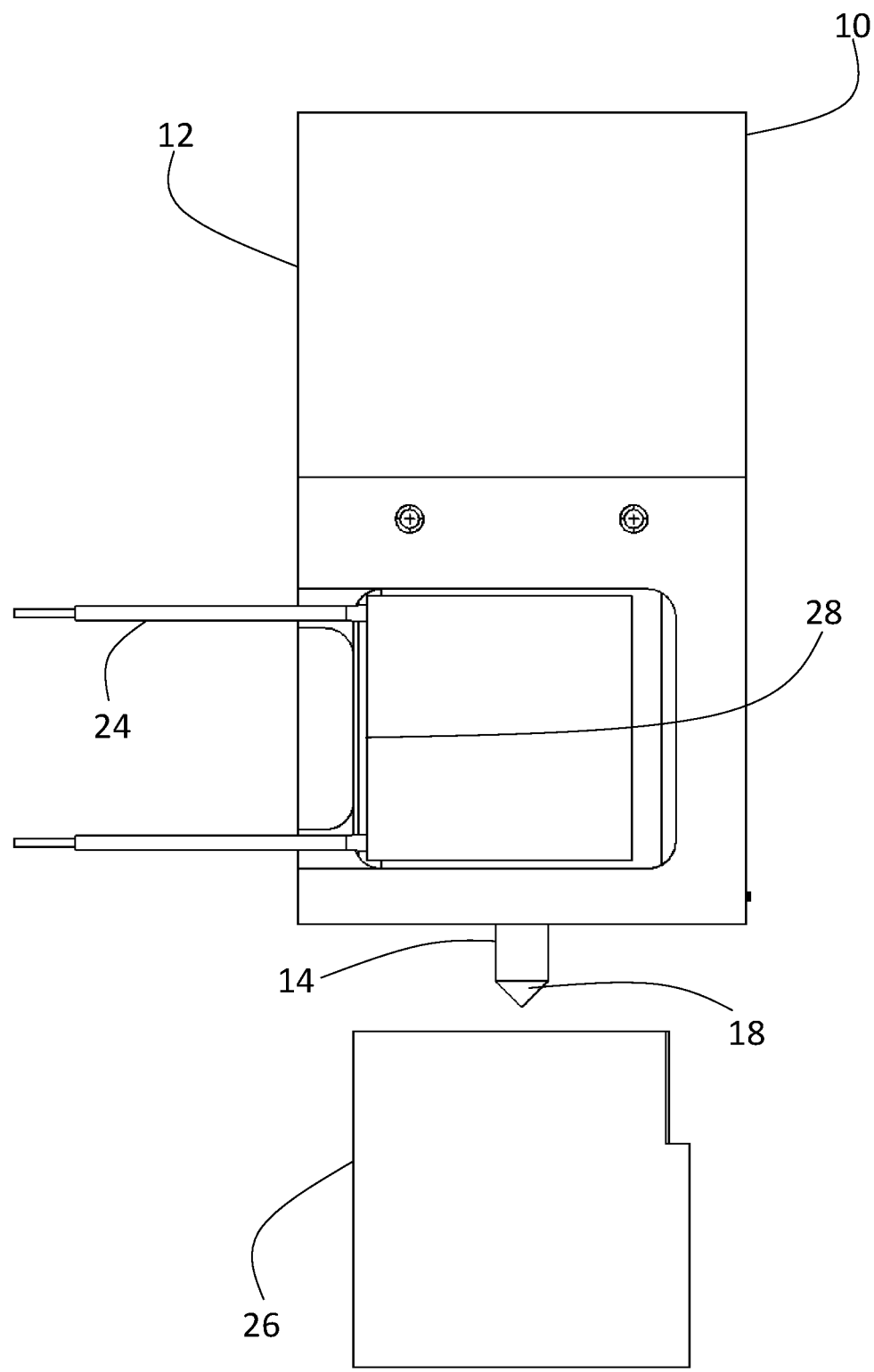
FIG. 5 is a schematic view of a solution electrode glow discharge apparatus with a Peltier cooler.

Referring to FIG. 4, a solution receptacle 26 is positioned in spaced relation to tip 18 of solid electrode 12. Solution receptacle 26 is placed at a distance from tip 18 such that a glow discharge is maintainable between tip 18 and a solution to be tested that is within solution receptacle 26. While it is standard practice for solution receptacle 26 and tip 18 to be in vertical alignment with each other as shown in FIG. 4, it will be understood by a person skilled in the art that the positioning of solution receptacle 26 in relation to tip 18 of solid electrode 12 is dictated solely by the ability to maintain a glow discharge between them during the testing process and, therefore, other orientations between solution receptacle 26 and tip 18 may be acceptable. A typical distance for SCGD ignition is approximately 1 mm between tip 18 and solution receptacle 26. A typical distance during measurements is 3-4 mm between tip 18 and solution receptacle 26. It will be understood by a person skilled in the art that other suitable distances may be used. In order to create a glow discharge, the solution to be tested has a different electrical potential than the electrical potential of solid electrode 14. FIG. 4 shows an embodiment of a standard solution receptacle. It will be understood by a person skilled in the art that other types of solution receptacles known to persons skilled in the art may be used.

Referring to FIG. 1, an electrically insulating and thermally conducting barrier 28 may be provided between electrical and thermal conducting block 20 and cooling mechanism 24. Electrically insulating and thermally conducting barrier 28 may be used to prevent exposure of cooling mechanism 24 to high voltages and temperatures. Electrically insulating and thermally conducting barrier 28 may not be necessary if there is no concern regarding exposing cooling mechanism 24 to high voltages and high heat.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. A solution electrode glow discharge apparatus, comprising:
 a housing containing a solid electrode, the solid electrode having a head and a tip, the tip of the solid electrode extending outwards from the housing;
 an electrical and thermal conducting block positioned within the housing, at least a portion of the head of the solid electrode being positioned within the electrical and thermal conducting block;
 a adjustable-polarity power supply in communication with the solid electrode; and
 a cooling mechanism to cool the electrical and thermal conducting block.

2. The solution electrode glow discharge apparatus of claim 1 further comprising a solution receptacle positioned in spaced relation to the tip of the solid electrode for holding solution to be tested, the solution to be tested having a different electrical potential than an electrical potential of the solid electrode, the solution receptacle being spaced from the tip of the solid electrode such that a glow discharge is maintainable.

3. The solution electrode glow discharge apparatus of claim 1 wherein the cooling mechanism passively cools the electrical and thermal conducting block.

4. The solution electrode glow discharge apparatus of claim 1 wherein the cooling mechanism actively cools the electrical and thermal conducting block.

5. The solution electrode glow discharge apparatus of claim 4 wherein the cooling mechanism is at least one heat pump.

6. The solution electrode glow discharge apparatus of claim 5 wherein the at least one heat pump is a Peltier cooler.

7. The solution electrode glow discharge apparatus of claim 3 wherein the cooling mechanism is a heatsink.

8. The solution electrode glow discharge apparatus of claim 1 wherein the adjustable-polarity power supply is in direct communication with the head of the solid electrode.

9. The solution electrode glow discharge apparatus of claim 1 wherein the adjustable-polarity power supply is in indirect communication with the head of the solid electrode through direct communication with the electrical and thermal conducting block.

10. The solution electrode glow discharge apparatus of claim 1 further comprising an electrically insulating and thermally conducting barrier between the electrical and thermal conducting block and the cooling mechanism.

* * * * *